United States Patent Office 3,663,651
Patented May 16, 1972

3,663,651
THERMAL-RESISTANT POLYIMIDE-EPOXY POLYMERS
George Robert Traut, Danielson, Conn., assignor to Rogers Corporation, Rogers, Conn.
No Drawing. Filed Sept. 3, 1970, Ser. No. 69,434
Int. Cl. C08g 45/12
U.S. Cl. 260—830 P                                10 Claims

ABSTRACT OF THE DISCLOSURE

Cross-linked, polyimide-epoxy polymers are prepared by reacting polyamide-acids, derived from the reaction of an excess of an organic dianhydride with an organic diamine with epoxy compounds, followed by curing the resultant reaction product, usually by heating, to give the polyimide-epoxy polymers.

BACKGROUND OF THE INVENTION

This invention relates to cross-linked, polyimide-epoxy resins. In particular, it relates to the reaction product of anhydride-terminated, polyamide-acid teleomers and epoxy compounds.

Polyimide resins derived from the reaction of aromatic polyanhydrides with primary aromatic polyamines are a class of well-known thermally stable polymers. Nevertheless, because of their infusible nature and limited solubility they are difficult to process. Generally, polyimides are formed by heat-curing the polyamide-acid precursors which are prepared from the reaction of an organic dianhydride with an organic diamine. One method of preparation involves casting the polyamide-acid as a film and thereafter heating it to the insoluble polyimide. Because imidazation of the polyamide-acid involves the evolution of considerable amounts of water or other condensation products, the cross-sectional area of the polyimides which can be obtained is limited.

We have now found that low molecular weight polyamide-acid polymers terminated by anhydride groups can be condensed with epoxy compounds, in particular polyepoxides, to give cross-linked polyimide-epoxy polymers or resins having superior thermal stability and electrical properties, especially dielectric values. The formation of these cross-linked resins is also accompanied by a lower evolution of condensates during the imidization step.

The cross-linked, polyimide-epoxy resins of the present invention are useful as electrical insulation material, especially where elevated temperatures are involved. In addition, because of their thermal stability the hereindescribed resins can be used in the preparation of laminated, flexible sheet insulation.

SUMMARY OF THE INVENTION

This invention broadly comprises cross-linked, polyimide-epoxy polymers and methods for their preparation. These compounds comprise the reaction product of:

(a) A polyamide-acid, prepared by reacting in an inert organic solvent below about 175° C., at least one diamine having the structural formula: $NH_2$—R—$NH_2$, wherein R is a divalent radical containing at least two carbon atoms and the two amino groups of said diamine are each attached to separate carbon atoms of the divalent radical, with at least one tetracarboxylic acid dianhydride having the structural formula:

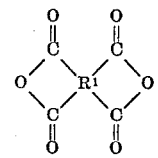

where $R^1$ is a tetravalent organic radical containing at least two carbon atoms, no more than two carbonyl groups of the dianhydride attached to any one carbon atoms of the tetravalent radical, and where the g.-equiv. weight ratio of the dianhydride: diamine is 1.05:1 or greater; and (b) An epoxy compound containing at least two epoxide groups.

This invention also comprises a method for preparing cross-linked polyimide-epoxy polymers which comprises the steps of:

(a) Contacting in an inert organic solvent below about 175° C. a diamine having the structural formula: $NH_2$—R—$NH_2$, wherein R is a divalent radical containing at least two carbon atoms, the two amino groups of said diamine are each attached to separate carbon atoms of the divalent radical, with at least one tetracarboxylic acid dianhydride having the structural formula:

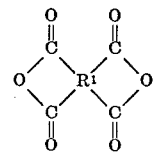

where $R^1$ is a tetravalent organic radical containing at least two carbon atoms, no more than two carbonyl groups of the dianhydride attached to any one carbon atom of the tetravalent radical, wherein the g.-equiv. weight ratio of the dianhydride to the diamine is from about 1.05:1 to 2:1; to give a solution of a polyamide-acid;

(b) Adding to the solution of the polyamide-acid an epoxy compound containing at least two epoxide groups;

(c) Removing the solvent to give a polymeric residue; and (d) Heating the polymeric residue above 50° C. to form a cross-linked polymer.

DETAILED DESCRIPTION OF THE INVENTION

The cross-linked, polyimide-epoxy resins of the present invention are prepared according to the reaction scheme outlined below:

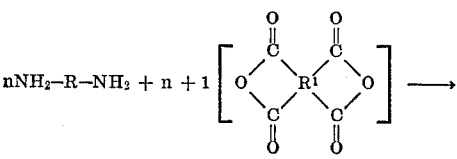

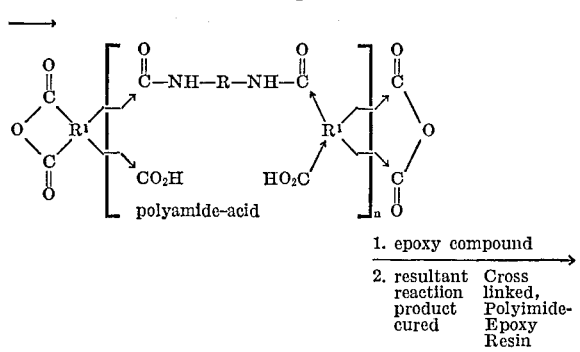

In the scheme above $n$ is an integer and → denotes isomerism; R is a divalent radical containing at least two carbon atoms, the two amino groups of which are attached to separate carbon atoms; and $R^1$ is an organic tetravalent radical containing at least two carbon atoms, no more than two carbonyl groups of which are attached to any one carbon atom.

The first step in the reaction scheme involves the preparation of the polyamide-acid telomer precursor. It has been found that in order to obtain polyimide-epoxy resins having the desired characteristics it is necessary that the molecular weight of the polyamide-acid polymer used in the reaction with the epoxy compound be fairly low, e.g., $n\sim\leq20$. It is further necessary that the polyamide-acid telomer be anhydride-terminated as illustrated in the reaction scheme above. We have found that these requisites can be realized by using at least a 5% excess of the dianhydride in the reaction with the diamine. If less than this amount is used, undesirable high molecular weight polyamide-acids are obtained. It has been found that the higher molecular weight polyamide-acid polymers ($n\sim>20$) do not provide the optimum degree of cross-linking upon reaction with the epoxy compounds. On the other hand, the reaction of low molecular weight polyamide-acids with epoxy compounds results in epoxy-polyimide resins having a higher degree of cross-linking than that obtainable with higher molecular weight polyamide-acid precursors.

After forming the polyamide-acid telomer, it is then mixed, generally in an inert solvent, with the epoxy compound. The resultant mixture is then cured by heating to give the desired cross-linked, polyimide-epoxy resin. As pointed out above, heat-curing of polyamide-acids generally yields polyimides. In the present invention, the exact nature of the formation of the polyimide-epoxy resins is not fully understood, although such an understanding is not necessary in order to practice the invention successfully. Nevertheless, it is believed that one course of the reaction consists of imidization of the polyamide-acid precursor, followed by reaction between the epoxy compound, which must contain at least two epoxy groups per molecule, and the anhydride-terminated portion of the resultant polyimide. It is probable, however, that some reaction between the epoxy compound and the free-carboxyl groups and terminal anhydride groups of the polyamide-acids precursor also occurs prior to imidization.

The organic diamines which can be used in the present invention to prepare the polyamide-acid precursors are represented by the formula:

$$NH_2-R-NH_2$$

wherein R, the divalent radical, can be any one of the following groups: aromatic, aliphatic, cycloaliphatic, combination of aromatic and aliphatic, heterocyclic, bridged organic radicals wherein the bridge is oxygen, nitrogen, sulfur, slicon or phosphorous, and substituted groups thereof. The preferred R groups in the diamines are those containing at least six carbon atoms characterized by benzenoid unsaturation, i.e., alternate double bonds in a ring structure. Among the diamines which are suitable for use in the present invention are:

meta-phenylene diamine;
para-phenylene diamine;
4,4'-diamino-diphenyl propane;
4,4'-diamino-diphenyl sulfide;
4,4'-diamino-diphenyl sulfide;
4,4'-diamino-diphenyl sulfone;
3,3'-diamino diphenyl sulfone;
4,4'-diamino-diphenyl ether;
2,6-diamino-pyridine;
bis-(4-amino-phenyl) diethyl silane;
bis-(4-amino-phenyl) phosphine oxide;
bis-(4-aminophenyl)-N-methylamine;
1,5-diamino-naphthalene;
3,3'-dimethyl-4,4'-diamino-biphenyl;
3,3'-dimethoxy benzidine;
2,4-bis-($\beta$-amino-t-butyl) toluene;
bis-(para-$\beta$-amino-t-butyl-phenyl) ether;
para-bis-(2-methyl-4-amino-pentyl) benzene;
para-bis-(1,1-dimethyl-5-amino-pentyl) benzene;
m-xylylene diamine;
p-xylylene diamine;
bis(para-amino-cyclohexyl) methane;
hexamethylene diamine;
heptamethylene diamine;
octamethylene diamine;
nonamethylene diamine;
decamethylene diamine;
3-methylheptamethylene diamine;
4,4-dimethylheptamethylene diamine;
2,11-diamino-dodecane;
1,2-bis-(3-amino-propoxy) ethane;
2,2-dimethyl propylene diamine;
3-methoxy-hexamethylene diamine;
2,5-dimethylhexamethylene diamine;
2,5-dimethylheptamethylene diamine;
5-methylnonamethylene diamine;
1,4-diamino-cyclohexane;
1,12-diamino-octadecane;
$NH_2(CH_2)_3O(CH_2)_2O(CH_2)_3NH_2$;
$H_2N(CH_2)_3S(CH_2)_3NH_2$;
$H_2N(CH_2)_3N(CH_3)(CH_2)_3NH_2$;
4,4'-diamino-diphenyl diphenylsilane;
4,4'-diamino-diphenyl ethyl phosphine oxide;
4,4'-diamino-diphenyl phenyl phosphine oxide, methane diamine; and
2,4'-diamino-6-phenyl-s-triazine. In addition, amide-modified diamines may be used as well, as for example, those illustrated by L. W. Frost and G. M. Bower in U.S. Pat. 3,197,635. Of particular interest is 3,4'-diaminobenzanilide. It should be realized of course that mixtures of the above diamines may also be used in practicing the present invention.

The organic dianhydrides which can be used in the present invention have the following structural formula:

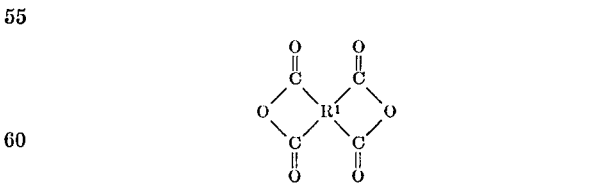

wherein $R^1$ is an organic tetravalent radical containing at least two carbon atoms and wherein no more than two carbonyl groups of the dianhydride are attached to any one carbon atom of the tetravalent radical. $R^1$ can be aromatic, aliphatic, cycloaliphatic, heterocyclic, combination of aromatic and aliphatic, and substituted groups thereof. However, the preferred dianhydrides are those in which the $R^1$ groups have at least six carbon atoms characterized by benzenoid unsaturation, i.e., alternate double bonds in a ring structure, wherein the four carbonyl groups of the dianhydride are each attached to separate carbon atoms and wherein each pair of carbonyl groups is directly attached to adjacent carbon atoms in the $R^1$ group to provide a five-member ring as follows:

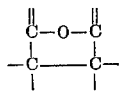

Illustrations of dianhydrides suitable for use in the present invention include:

pyromellitic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
1,2,3,4-cyclopentane tetracarboxylic dianhydride;
2,2',3,3'-diphenyl tetracarboxylic dianhydride;
2,2-bis (3,4-dicarboxyphenyl) propane dianhydride;
2,3,4,5-pyrrolidine tetracarboxylic dianhydride;
3,4,9,10-perylene tetracarboxylic dianhydride;
bis (3,4-dicarboxyphenyl) ether dianhydride;
naphthalene-1,2,4,5-tetracarboxylic dianhydride,
2,2-bis-(2,3-dicarboxyphenyl) propane dianhydride,
1,1-bis(2,3-dicarboxyphenyl) ethane dianhydride,
1,1-bis (3,4-dicarboxyphenyl) ethane dianhydride,
bis (3,4-dicarboxyphenyl) methane dianhydride,
bis (3,4-dicarboxyphenyl) methane dianhydride,
benzene-1,2,3,4-tetracarboxylic dianhydride,
pyrazine-2,3,5,6-tetracarboxylic dianhydride,
thiophene-2,3,4,5-tetracarboxylic dianhydride,
3,4,3',4'-benzophenone tetracarboxylic dianhydride; and
bis (3,4-dicarboxyphenyl) sulfone dianhydride.

As in the case of the diamines, mixtures of the dianhydrides can be used as well.

The polyacid-amide telomer reaction may be conducted in one of several fashions: (1) The ingredients may be mixed together as dry powders and then added, with agitation, to a solvent for one or both of the reactants; (2) the solvent may be added to the premixed powders; (3) either reactant may be added as a solid powder to a solution of the remaining ingredient; (4) both ingredients may be used in solution in a suitable solvent. Combinations of these methods may also be used.

It is preferred that the reagent addition be conducted in such a manner that the dianhydride is always in excess throughout the addition procedure. The solvents useful in the solution polymerization process for synthesizing the polyamide-acid compositions are organic solvents whose functional groups do not react with either of the reactants (the diamines or the dianhydrides) to the greater extent than the reactants do with each other. Besides being inert to the system, and preferably, being a solvent for at least one of the reactants, preferably for both of the reactants. The organic solvents of the N,N-dialkylcarboxylamide class are useful as solvents in the practice of this invention. The preferred solvents are the lower molecular weight members of this class, particularly N,N-dimethylformamide and N,N-dimethylacetamide. They may easily be removed by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which may be used are: dimethylsulfoxide, N-methyl-2-pyrrolidone, tetramethylene urea, pyridine, dimethylsulfone, hexamethylphosphoramide, tetramethylene sulfone, formamide, N-methylformamide and N-acetyl-2-pyrrolidone. The above solvents can be used alone, or in combination. They can also be used in combination with poorer solvents such as benzene, benzonitrile, dioxane, butyrolactone, xylene, toluene, cyclohexane and acetone.

As previously stressed, the dianhydride must be present at least in a 5% excess; preferably greater. In the examples set forth hereinafter the proportions of dianhydrides, diamines, and epoxides are given in gram-equivalent (g.-equiv.) weights. The gram-equivalent weight as used herein is defined as the molecular weight of the compound divided by the number of amino, anhydride or epoxide groups present. Since we are concerned with dianhydrides and diamines the ratio of dianhydride:diamine will be, of course, the same whether the compounds are represented on a mole basis or a g.-equiv. weight basis. As already mentioned, we prefer a minimum of a 5% excess of the dianhydride in the preparation of the polyamide-acid. We have found that excellent results are obtained when the g.-equiv. ratio or molar ratio of the dianhydride:diamine is from 20:19 (1.05:1) to 2:1; with ratios of 4:3 and 3:2 being preferred.

The organic diamine and dianhydride are reacted together in the manner previously described at a temperature below about 175° C. to give the polyamide-acid telomer. The temperature is usually kept below about 60° C., preferably below about 50° C. Since the reaction is exothermic it is usually necessary to cool the reaction flask and/or regulate the rate of addition of the reagent. The quantity of solvent used in the reaction need only be sufficient to dissolve the reactants.

After the polyamide-acid precursor has formed, the epoxy compound is added to the polyamide-acid solution. The addition can be performed any time after the preparation of the polyamide-acid polymer, although we generally prefer to add the epoxy compound within one hour after formation of the polyamide-acid polymer.

As indicated previously, the epoxides suitable for use in the present invention must have at least two epoxy groups. Polyepoxides are preferred and may be saturated or unsaturated, aliphatic, cycloaliphatic, or heterocyclic and may be further substituted with substituents such as chlorine atoms, hydroxyl groups, ether radicals, and the like.

The classes of epoxides suitable for use as described herein include, but are not necessarily limited to the following: the glycidal polyethers of polyhydric phenols obtained by reacting a polyhydric phenol with an excess of a chlorohydrin; polyepoxy polyethers obtained by reacting a halogen-containing epoxide with a polyhydric alcohol, and subsequently treating the resulting product with an alkaline component; the polyepoxy polyethers obtained by esterifying a polycarboxylic acid with an epoxy-containing alcohol; the polyepoxy polyhydroxy polyethers obtained by reacting a polyhydric alcohol or phenol with a polyepoxide; the hydroxy-substituted polyepoxy polyethers obtained by reacting a slight excess of a halogen-containing epoxide with a polyhydric phenol; and the polymers and copolymers of the epoxy-containing monomers possessing at least one polymerizable ethylenic linkage. These epoxy resins also result from reaction between hydrogen peroxide or peroxygen acids with butadiene polymers and copolymers.

A common type of epoxy resin suitable for use in the present invention is made by reacting epichlorohydrin and a di-hydroxy compound, of which bisphenol-A is a representative compound. Other useful dihydroxy compounds include glycerol, resorcinol, and various glycols. Polyfunctional epoxidized novolacs are made by reacting epichlorohydrin with novolacs of phenols and one or more substituted phenols.

It should be understood that mixtures of the above-described epoxy resins are also suitable for use in the present invention.

After the epoxy compound has been added to the polyamide-acid solution, the resulting mixture is stirred for several minutes and then formed into a useful shape by coating onto a variety of substrates such as metals, glass or polymeric materials in the form of sheets, wires, fibers, foams, woven or nonwoven fabrics, or cast as a film. The solvent is removed by evaporation, displacement or diffusion, and the polymeric residue is cured, usually by heating, to give a cross-linked, polyimide-epoxy resin. Heat curing assists in completing the reaction between the epoxy compound and the terminal anhydride groups of the polyamide-acid polymer and also promotes the condensation of the carboxy and secondary amine groups in the polyamide-acid polymer, e.g., the imidization reaction. We have found that curing will occur above about 150° C.

A sufficient amount of epoxy compound is added to provide at least one equivalent weight of epoxy for each equivalent weight of terminal anhydride. Since an excess of dianhydride is used, it is usually assumed that there is complete reaction between the diamine and the dianhydride, and each polyamide-acid polymer molecule is anhydride-terminated. It has been found that optimum results are obtained when the g.-equiv. weight ratio anhydride:diamine:epoxide is kept within the limits X:Y:1.0 to X:Y:1.8, where X is the g.-equiv. weight of dianhydride, Y is the g.-equiv. weight of diamine, and X and Y are so chosen that X:Y is from about 1.05:1 to 2:1. Thus the g.-equiv. weight ratio of dianhydride:diamine:epoxide covers the range from about 20:19:1 to 20:19:1.8, to about 2:1:1 to 2:1:1.8. Preferred ranges are from 3:2:1 to 3:2:1.8 and from 4:3:1 to 4:3:1.8..

Although it is preferred to conduct the reaction between the polyamide-acid and the epoxy compound in solution as described hereinabove, it is also possible to isolate the polyamide-acid polymer and then react it directly with the epoxy compound in the absence of solvent. Further, it is possible to convert the polyamide-acid precursor to the polyimide, either by heat curing it or alternatively by treating it with a dehydrating agent such as acetic anhydried, alone, or in conjunction with a tertiary amine in the manner described in U.S. Pat. 3,179,634; followed by reaction of the polyimide with the epoxy compound. Nevertheless, it is more convenient to perform the sequence of reactions in a solvent in the manner described.

It is understood that the materials described herein may be modified with inert materials, either before or after blending with the epoxy resin and either prior or subsequent to shaping or forming into a useful article. Such modifying agents may be selected from a variety of types such as pigments, dyes, inorganic or organic fillers, heat and light stabilizers, and lubricants.

The polyamide-acid-epoxy composition in solution may be used as a liquid coating composition. Such coating compositions may be pigmented with such compounds as titanium dioxide in amounts of 5–200% by weight. These coating compositions may be applied to a variety of substrates, for example, metals, e.g., copper, brass, aluminum, steel, etc., the metals in the form of sheets, fibers, wires, screening, etc.; glass in the form of sheets, fibers, foams, fabrics, etc.; polymeric materials, e.g., cellulosic materials such as cellophane, wood, papers, etc., polyolefins such as polyethylene, polypropylene, polystyrene, etc., polyesters such as polyethylene terephthalate, etc., perfluorocarbon polymers such as polytetrafluoroethylene, copolymers of tetrafluoroethylene with hexafluoropropylene, etc., polyurethanes, all polymeric materials in the form of sheets, fibers, foams, woven and nonwoven fabrics, screening ,etc.; leather sheets; and the like.

After coating these substrates, the solvent is evaporated and the polyamide-acid-epoxy residue is then cured, as previously described, to the cross-linked, polyimide-epoxy resin.

The following examples are provided to illustrate further the scope of the present invention; however, they should not be construed to be limitations thereof.

Example I

A solution of 4.7 g. (.045 g.-equiv.) of 1,2,3,4-cyclopentanetetracarboxylic dianhydride in 10 ml. of N,N-dimethylformamide is added to a solution of 2.6 g. (.026 g.-equiv.) of 4,4'-methylene dianiline in 10 ml. of N,N-dimethylformamide. The solution becomes brownish-maroon, accompanied by heat generation. The reaction mixture is kept below about 60° C.; preferably below 50° C. After cooling the mixture, a solution of 2.7 g. (.015 g.-equiv.) of D.E.N. 438 (diglycidyl ether of a Novolac resin having an ethylene oxide equivalent weight of 178; available from the Dow Chemical Co., Midland, Mich.) in 1.0 ml. of acetone is added. The equivalent-weight ratio of dianhydride:diamine:epoxide is 3:2:1.2.

A swatch of J. P. Stevens and Company (Garfield, N.J.) Style 1526 fiber glass cloth is dip-coated with the resultant solution several times to afford about 100% resin pick-up. The solvent adhering to the coating glass cloth is evaporated and the remaining polymeric coating cured by heating the cloth in a forced air convection oven starting at 95° C. and increasing the temperature to about 150–160° C. over about a one hour period. The resultant polymeric coating on the glass cloth is tough and translucent and resists thermal degradation at temperatures above 300° C.

Example II

A solution of 5.4 g. (.034 g.-equiv.) of 3,4,3',4'-benzophenone tetracarboxylic dianhydride in 10 ml. of N,N-dimethylformamide is added to a solution of 2.2 g. (.022 g.-equiv.) of 4,4'-methylene dianiline in 10 ml. of N,N-dimethylformamide. The solution becomes warm and turns dark-brown. To the mixture is added 2.8 g. of an 85% solution of D.E.N. 438 in acetone (.014 g.-equiv.). The equivalent-weight ratio of dianhydride:diamine: epoxide is 3:2:1.3.

When swatches of fiber glass are coated with this polyamide-acid-epoxy composition and dried and cured in the manner of Example I, tough translucent polymeric coatings are obtained which resist thermal degradation above 400° C.

Example III

A solution of 5.1 g. (.032 g.-equiv.) of 3,4,3',4'-benzophenone tetracarboxylic dianhydride in 20 ml. of N,N-dimethylformamide is mixed with a solution of 2.6 g. (.021 g.-equiv.) of 4,4'-diaminodiphenylsulfone in 10 ml. of N,N-dimethylformamide to give an orange-yellow solution. To the cooled mixture is added a solution of 2.3 g. (.013 g.-equiv.) of D.E.N. 438 in 1.0 ml. of acetone.

The equivalent-weight ratio of dianhydride:diamine: epoxide is 3:2:1.2.

When fiber glass cloths are dip-coated with this mixture and further treated in the manner described in Example I, polymeric coatings are obtained on the cloth which are tough and translucent and resist thermal degradation at temperatures up to about 400° C.

Example IV

A solution of 4.4 g. (.042 g.-equiv.) of 1,2,3,4-cyclopentanetetracarboxylic dianhydride in 20 ml. of N,N-dimethylformamide is mixed with a solution of 3.0 g. (.024 g.-equiv.) of 4,4'-diaminodiphenylsulfone in 10 ml. of N,N-dimethylformamide. To the resultant mixture is then added a solution of 2.6 g. of D.E.N. (.015 g.-equiv.) in 1.0 ml. of acetone.

The equivalent-weight ratio of dianhydride:diamine: epoxide is 3.5:2:1.2.

When fiber glass cloths are dip-coated with this mixture and further treated according to the procedure of Example I, polymeric coatings are obtained which are tough and translucent and possess superior thermal stability.

Example V

A solution containing 4.0 g. (about .04 g.-equiv. weights) of 4,4' methylene dianiline in N,N-dimethylformamide is slowly stirred into a solution containing 9.7 g. solids (about 0.06 g.-equiv. weights) of 3,4,3',4'-benzophenone tetracarboxylic dianhydride in N,N-dimethylformamide. To the resultant solution is added a solution containing 4.3 g. solids (about .024 g.-equiv. weights) D.E.N. 438, in N,N-dimethylformamide. The equivalent-weight ratio of dianhydride:diamine:epoxide is 3:2:1.2. The resultant solution is used to coat a woven fiber glass cloth. The solvent is evaporated by heating for 10 minutes at 200° F., 10 minutes at 225° F., 10 minutes at 250° F., 10 minutes at 275° F., and 10 minutes at 300° F. The resultant polymeric coating on the glass cloth is tough and translucent. Moreover, after heating for one hour at 160° C., one hour at 170° C., one hour at 180° C., etc. up to one hour at 340° C. in a circulating air oven, the film remains tough and heat resistant.

Example VI

A solution in N,N-dimethylformamide containing 5.0 g. (about .04 equivalent) of diaminodiphenyl sulfone is slowly stirred into a solution containing 9.7 g. (about .06 equivalent) of 3,4,3',4'-benzophenone tetracarboxylic dianhydride in N,N-dimethylformamide. To the resultant solution is added a solution containing 4.3 g. (about .024 equivalent) of D.E.N. 438 in acetone. The equivalent-weight ratio of dianhydride:diamine:epoxide is 3:2:1.2. This solution is used to coat a woven fiber glass cloth. The polymeric coating remaining adhered to the substrate subsequent to solvent evaporation is tough and translucent and extremely heat stable.

Example VII

A solution of 5.9 g. (.037 g.-equiv.) of 3,4,3',4'-benzophenone tetracarboxylic dianhydride in 20 ml. of N,N-dimethylformamide is mixed with a solution of 3.1 g. (.025 g.-equiv.) of 4,4'-diaminodiphenylsulfone in 10 ml. of N,N-dimethylformamide. To the resultant solution is added 1.0 g. (.015 g.-equiv.) of ER-4206 (vinylcyclohexene dioxide; available from Union Carbide).

The equivalent-weight ratio of dianhydride:diamine:epoxide is 3:2:1.2.

When fiber glass cloths are dip-coated with this mixture and further treated according to the procedure of Example I, polymeric coatings are obtained which are tough and translucent and are thermally stable up to about 500° C.

Example VIII

To a solution containing 9.7 g. (about .06 equivalent) of 3,4,3',4'-benzophenone tetracarboxylic dianhydride is slowly added, under agitation, a solution containing 5.0 g. (about .04 equivalent) of diaminodiphenylsulfone in N,N-dimethylformamide. 1.7 g. of vinylcyclohexene dioxide is added to this solution and a saturated glass cloth swatch prepared as described in Example I. The resultant polymeric coating is tough, flexible and extremely heat resistant.

Example IX

The monomers listed in Table I are also reacted in the indicated proportions according to the procedure of Example I. The polyimide-epoxy polymeric coatings thus obtained are extremely tough and possess excellent thermal stability.

Example X

Examples I–IX are repeated according to the procedure of Example I using appropriate amounts of the monomers to give the following equivalent weight ratios:

EQUIVALENT-WEIGHT RATIO

| Dianhydride | Diamine | Epoxy resin |
|---|---|---|
| 2 | 1 | 1.0 |
| 2 | 1 | 1.2 |
| 2 | 1 | 1.5 |
| 4 | 3 | 1.0 |
| 4 | 3 | 1.5 |
| 6 | 5 | 1.0 |
| 6 | 5 | 1.2 |
| 11 | 10 | 1.2 |
| 11 | 10 | 1.8 |
| 20 | 19 | 1.0 |
| 20 | 19 | 1.1 |

The polyimide-epoxy polymeric coatings obtained are found to be tough, translucent and flexible and possess excellent heat stability.

Example XI

When Examples I–X are repeated with the appropriate amounts of the diamines, dianhydrides, and epoxy resins listed below, tough, translucent, and flexible polyimide-epoxy polymeric films are obtained which are found to possess excellent thermal stability.

| Dianhydride | Diamine | Epoxy resin |
|---|---|---|
| 2,2',3,3'-diphenyl tetracarboxylic dianhydride; bis-(3,4-dicarboxyphenyl)sulfone dianhydride; bis-(3,4-dicarboxyphenyl)ether dianhydride | 4,4'-diaminodiphenyl propane; benzidine; 1,5-diaminonaphthalene m-xylylene diamine; hexamethylene diamine; decamethylene diamine; 1,4-diamine cyclohexane | E.R.L. 2258 [1]; butadiene diepoxide; divinylbenzene diepoxide; vinylcyclohexene diepoxide; isoprene diepoxide; cyclopentadiene diepoxide |

[1] E.R.L. 2258, an 80%–20% blend of epoxidized cyclopentadiene ether—low molecular weight Bisphenol-A epoxides, E.E.W.=130, available from Union Carbide.

Example XII

When Examples I–XI are repeated using the following solvents in place of N,N - dimethylformamide, substantially the same results are obtained in each instance:

N,N-diethylformamide   N-methyl-2-pyrrolidone
N,N-diethylacetamide   dimethyl sulfoxide
N-methylcaprolactam

Example XIII

Specimens of aluminum, copper, brass, and stainless steel are cleaned with emery cloth and steel wool, followed by rinsing with trichloroethylene. The metal samples are dip-coated with the solutions of the polyamide-acid-epoxy mixtures of Examples I–XI and heated

TABLE I

| No. | Dianhydride [1] | Parts by weight | Diamine [2] | Parts by weight | Epoxy resin [3] | Weight | Equiv. wt. ratio dianhydride: diamine: epoxy resin |
|---|---|---|---|---|---|---|---|
| 1 | BPDA | 55.88 | MDA | 22.91 | ER 4221 | 21.22 | 3.0:2.0:1.4 |
| 2 | BPDA | 52.16 | MDA | 21.38 | ER 4228 | 26.46 | 3.0:2.0:1.4 |
| 3 | BPDA | 60.54 | MPD | 13.54 | EP 828 | 25.92 | 3.0:2.0:1.1 |
| 4 | BPDA | 50.85 | DADPS | 31.33 | EP 828 | 17.81 | 5.0:4.0:1.5 |
| 5 | BPDA | 53.39 | DADPS | 32.90 | EP 828 | 13.72 | 5.0:4.0:1.1 |
| 6 | BPDA | 60.54 | PPD | 13.54 | EP 828 | 25.92 | 3.0:2.0:1.1 |
| 7 | CPDA | 50.90 | MPD | 17.45 | DEN 438 | 31.64 | 3.0:2.0:1.1 |
| 8 | PMDA | 59.36 | MPD | 23.52 | ER 4221 | 17.12 | 5.0:4.0:1.2 |
| 9 | PMDA | 59.36 | PPD | 23.52 | ER 4221 | 17.12 | 5.0:4.0:1.2 |

[1] BPDA=3,4,3',4',-benzophenone tetracarboxylic dianhydride (E.W.=161); CPDA=1,2,3,4-cyclopentanetetracarboxylic dianhydride (E.W.=105); PMDA=Pyromellitic dianhydride (E.W.=109).
[2] MPD=m-Phenylenediamine (E.W.=54); MDA=4,4'-methylene dianiline (E.W.=99); PPD=p-Phenylenediamine (E.W.=54); DADPS=4,4'-diaminodiphenylsulfone (E.W.=124).
[3] ER 4221=E.R.L. 4221 epoxy cyclohexyl methyl epoxy cyclohexane carboxylate, E.E.W. 131, available from Union Carbide; ER 4228=E.R.L. 4228 a flexible peracid epoxy resin, E.E.W. 175, available from Union Carbide; EP 828=Epon 828 Condensation product of epichlorohydrin and Bisphenol A, E.E.W. 188; available from Shell Chemical Company, New York, New York; DEN 438=D.E.N. 438 diglycidyl ether of Novolac resin obtained by condensation of epichlorohydrin and Novolac resin; E.E.W. 178; available from the Dow Chemical Company, Midland, Michigan.

in an oven at about 150° C. for about one hour to evaporate the solvent and then at 300-325° C. for several minutes to cure the resin to the polyimide-epoxy form. The polymeric coatings, which adhere well to the metals, are tough, translucent and heat resistant.

Example XIV

When the polyamide-acid-epoxy solutions of Examples I-XI are used to coat films of polyethylene terephthalate and cellophane, and nonwoven mats of fibrous polyethylene and polypropylene, and thereafter cured, tough, translucent coatings are obtained which are heat resistant.

Example XV

When the polyamide-acid-epoxy solutions of Examples I-X are used to coat strands of No. 18 copper wire and cured, tough, translucent coatings are obtained which have a high degree of thermal resistance.

While a preferred embodiment has been shown and described, various modifications and substitutions may be made without departing from the spirit and scope of this invention. Accordingly, it is to be understood that this invention has been described by way of illustration and not limitation.

What is claimed is:

1. A cross-linked polymer comprising the reaction product of:
   (a) a polyamide-acid prepared by reacting in an inert organic solvent below about 175° C., at least one diamine having the structural formula:

$$NH_2—R—NH_2$$

wherein R is a divalent radical containing at least two carbon atoms and the two amino groups of said diamine are each attached to separate carbon atoms of the divalent radical, with at least one tetracarboxylic acid dianhydride having the structural formula:

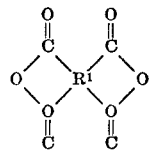

wherein $R^1$ is a tetravalent organic radical containing at least two carbon atoms, no more than two carbonyl groups of the dianhydride are attached to any one carbon atom of the tetravalent radical, and
   (b) an epoxy compound containing at least two epoxide groups, wherein the g.-equiv. weight ratio of dianhydride:diamine:epoxide is from X:Y:1.0 to X:Y:1.8 where X is the q.-equiv. weight of dianhydride, Y is the g-equiv. weight of diamine, and X:Y are so chosen that X:Y is from about 1.05:1 to 2:1.

2. The cross-linked polymer as defined in claim 1 wherein the diamine is selected from the group consisting of m-phenylendiamine, p-phenylenediamine, 4,4'-diaminodiphenyl oxide, 4,4'-diaminodiphenylsulfone and 4,4'-methylene dianiline.

3. The cross-linked polymer as defined in claim 1 wherein the dianhydride is selected from the group consisting of pyromellitic dianhydride, 1,2,3,4-cyclopentanetetracarboxylic dianhydride and 3,4,3',4'-benzophenone tetracarboxylic dianhydride.

4. The cross-linked polymer as defined in claim 1 wherein the epoxy compound is an epoxy resin derived from the reaction of a Novolac resin and epichlorohydrin.

5. The cross-linked polymer as defined in claim 1 wherein the epoxy compound is an epoxy resin derived from the reaction of Bisphenol A and epichlorohydrin.

6. The cross-linked polymer as defined in claim 1 wherein the epoxy compound is selected from the group consisting of butadiene diepoxide, divinylbenzene diepoxide, vinylcyclohexene diepoxide, isoprene diepoxide and cyclopentadiene diepoxide.

7. A substrate coated with the cross-linked polymer of claim 1.

8. A metal wire coated with the cross-linked polymer of claim 1.

9. A metal coated with the cross-linked polymer of claim 1.

10. A process for preparing a cross-linked polymer which comprises the consecutive steps of:
    (a) contacting in an inert organic solvent below about 175° C. a diamine having the structural formula:

$$NH_2—R—NH_2$$

wherein R is a divalent radical containing at least two carbon atoms and the two amino groups of said diamine are each attached to separate carbon atoms of the divalent radical, with at least one tetracarboxylic acid dianhydride having the structural formula:

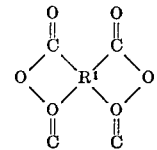

where $R^1$ is a tetravalent organic radical containing at least two carbon atoms, no more than two carbonyl groups of the dianhydride are attached to any one carbon atom of the tetravlent radical,
    (b) adding to the solution of the polyamide-acid an epoxy compound containing at least two epoxide groups, wherein the g.-equiv. weight ratio of dianhydride:diamine:epoxide is from X:Y:1.0 to X:Y:1.8 where X is the g.-equiv. weight of dianhydride, Y is the g.-equiv. weight of diamine, and X:Y are so chosen that X:Y is from about 1.05:1 to 2:1;
    (c) removing the solvent to give a polymeric residue; and
    (d) heating the polymeric residue above 150° C. to form a cross-linked polymer.

References Cited

UNITED STATES PATENTS

| | | | |
|---|---|---|---|
| 3,458,595 | 7/1969 | Vlmer | 260—830 P |
| 3,416,994 | 12/1968 | Chalmers | 260—830 P |
| 3,453,292 | 7/1969 | Izumi | 260—830 P |

PAUL LIEBERMAN, Primary Examiner

U.S. Cl. X.R.

117—126 R, 132 Ep, 138.8 D, 138.8 E, 138.8 F, 138.8 UA, 145, 148, 155 R; 260—2.5 Ep, 2.5 N, 37 N, 78 TF